Aug. 24, 1954  G. BOUCHET  2,687,126
IMPROVEMENTS IN CONTROL OF SUN FURNACES
Filed July 22, 1949
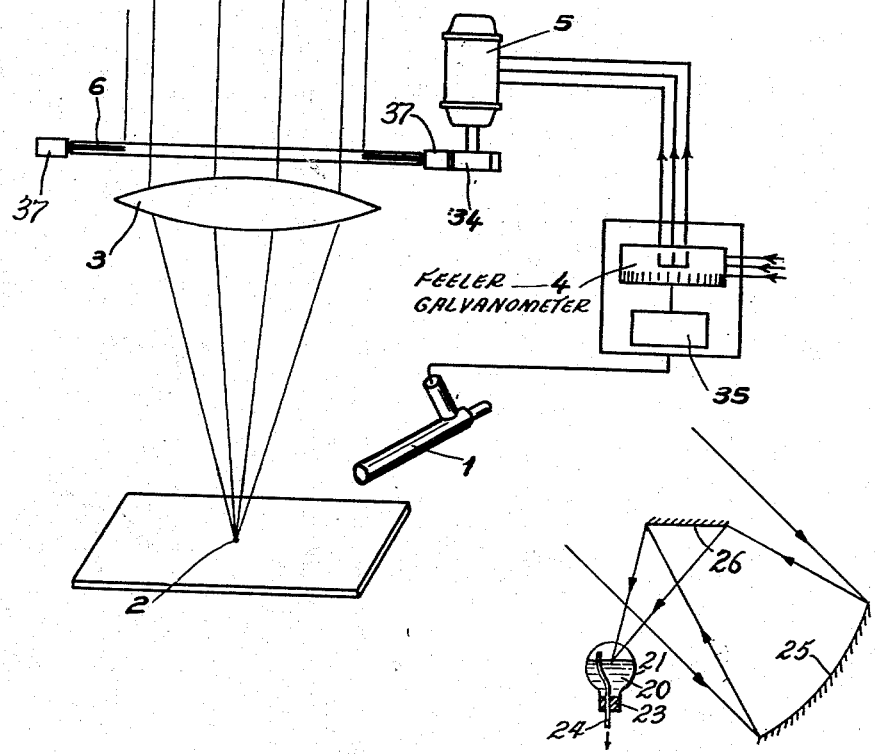
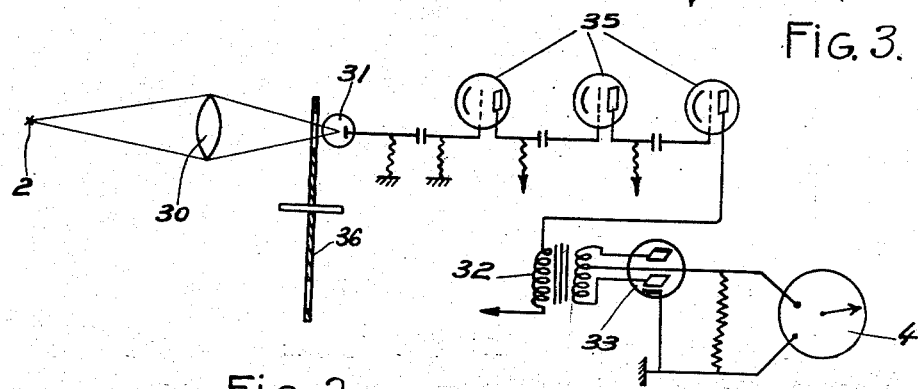
Inventor
Georges Bouchet
By his attorneys
Howson and Howson.

Patented Aug. 24, 1954

2,687,126

UNITED STATES PATENT OFFICE 2,687,126

IMPROVEMENTS IN CONTROL OF SUN FURNACES

Georges Bouchet, Bellevue, France, assignor to Prosilis, Paris, France

Application July 22, 1949, Serial No. 106,243

Claims priority, application France July 26, 1948

3 Claims. (Cl. 126—270)

It has already been proposed to use the high temperature generated by the concentration of the solar radiation to obtain energy, for effecting various operations, such as the melting of metals or of materials hard to melt, or for effecting certain chemical operations.

The heating may take place either always at the same point of the material to be heated or at successive points (case of a continuous melting of a surface for example).

In such operations, the great difficulty resides in the adjustment of the temperature to be obtained. In particular, when a continuous fusion is desired of a powdered load, in equilibrium, consisting of a material which is a poor conductor of heat, such as silica, the load may be arranged horizontally on a plate or tray and a regular relative displacement of the load and of the zone of energy concentration may be provided. A rough plate of pure silica is obtained, thereby, whose thickness at each point reproduces faithfully the variations of the energy received.

The present invention makes it possible to solve these adjustment difficulties.

It consists in ensuring, directly or indirectly, an interdependence between the temperature obtained at the focus of an apparatus concentrating the solar energy and the variations of said radiation so as to effect in a constant manner the operations, such as a fusion, obtained by the concentration of said radiation.

According to one mode of application of this method, an interdependence is established between the intensity of the radiation received and the temperature obtained at the point of concentration or that obtained at an auxiliary point used for the adjustment.

The invention is also applicable to a sun furnace with such an interdependence to the manufacture of very pure silica glass.

There are described hereinafter, merely by way of example a few arrangements embodying the invention. In this description reference is made to the appended drawings wherein:

Figure 1 is a view of an installation for the interdependence of the temperature reached at one focus and the variations of the radiation.

Figure 2 is an electrical diagram relative to Fig. 1;

Figure 3 shows an arrangement for obtaining very pure silica glass.

In one form of the invention, an instrument of a known type (pyrometer with vanishing filament, a total radiation pyrometer, a photo-electric cell, etc.) establishes a relationship between the temperature of the heated point and another value which, through the medium of a set of suitable relays acts on the surface collecting the solar energy either by masking a portion of said surface or by causing a portion of said surface to pivot in such a manner that the solar radiations collected and transmitted thereby no longer converge at the point being heated.

By way of example, according to Figure 1, the pyrometer 1 is arranged with its axis pointing towards the focus 2 of lens 3. Through the medium of the relays 4, said pyrometer acts on the servomotor 5 which opens or closes more or less the diaphragm 6 provided in the path of the rays in like manner to the opening and closing of the iris-type shutter of a camera.

In this example, the pyrometer 1 is of the total radiation type, capable of generating a current which is proportional to or an increasing function of the energy received at the focus 2. This pyrometer comprises an optical system 30 (Fig. 2), and a photo-electric cell 31. Following said cell, are amplification stages 35, giving a current proportional to the input current. These amplifier stages at the output of which are a transformer 32 and a double diode 33 energize the relay 4 consisting of a feeler galvanometer of the type used for the regulating of temperature by means of a thermo-electric couple. Since the amplifier shown is of the alternating current type, the light received by the cell 31 should be made intermittent, for instance by means of a disc 36, provided with slots.

The scale of this galvanometer is calibrated in terms of temperature according to the indications of the pyrometer instrument 1. This galvanometer, by means of contacts changes the direction of rotation of the motor 5 in such a manner that the diaphragm 6 opens in case the current decreases and closes in the case of an excess of current at the output of the amplifier 35.

The mechanical coupling between the motor 5, which may be of the three-phase asynchronous type and the diaphragm 6 may be obtained, as shown, by a pinion 34 acting on a ring 37 provided with teeth operating the diaphragm 6.

Figure 3 shows the application of the invention to the manufacture of very pure silica glass. According to the invention, the powdered load is arranged inside a closed and transparent chamber inside which a vacuum is made and the radiation of the energy source is concentrated on various points of the load, one after another.

This process, by avoiding any contact with a foreign body during the melting, makes it possible to obtain a fused silica as pure as the initial material.

The load of quartz powder 20 is contained in a flask 21 of transparent silica glass, closed by a stopper 23 through which passes a pipe 24. A vacuum is effected inside said flask through said pipe.

The flask is inverted so that the pipe goes through the load and opens above.

The radiated energy is concentrated onto the surface of the load by means of a large mirror 25 and a small mirror 26 serving as an auxiliary reflector.

By acting either on the flask or on the optical system, every point of the surface can be melted and rough plates of perfectly pure, transparent fused silica can be obtained.

These rough plates can then be treated in a furnace, at atmospheric pressure, to finish the elimination of bubbles which may have formed during the first operation under a reduced pressure.

This last operation can introduce no impurities inside the glass since the plate, at that time, is already cast and offers no porosity.

What I claim is:

1. In a solar furnace, in combination, optical means for concentrating solar energy, a focal support on which said energy is concentrated, variable screening means associated with said optical means, said screening means being movable to increase or decrease the amount of solar energy concentrated, means responsive to the temperature at said focal support, and relay means acting on said variable screening means and operated by said temperature responsive means to maintain said temperature at a substantially constant predetermined value.

2. In a solar furnace, the combination claimed in claim 1 wherein said temperature responsive means comprises an optical pyrometer and said relay means comprises a photo-electric cell exposed to the radiations issuing from said pyrometer.

3. In a solar furnace, the combination claimed in claim 2 further comprising a revolving slotted disc imparting an intermittent character to the beam of rays from said pyrometer to said photo-electric cell, A.-C. amplifier means fed by the output from said cell, a feeler galvanometer actuated by the output from said amplifier means, and a reversible electric motor selectively operated by said galvanometer and acting on said variable screening means.

References Cited in the file of this patent

UNITED STATES PATENTS

| Number | Name | Date |
|---|---|---|
| 495,163 | Severy | Apr. 11, 1893 |
| 496,959 | Severy | May 9, 1893 |
| 683,088 | Wideen | Sept. 24, 1901 |
| 797,891 | Himalaya | Aug. 22, 1905 |
| 1,479,923 | Moreau | Jan. 8, 1924 |
| 1,951,404 | Goddard | Mar. 20, 1934 |
| 2,030,350 | Bremser | Feb. 11, 1936 |
| 2,291,534 | Deppe | July 28, 1942 |

FOREIGN PATENTS

| Number | Country | Date |
|---|---|---|
| 19,560 | Great Britain | of 1914 |